(12) United States Patent
Hidaka et al.

(10) Patent No.: US 11,994,482 B2
(45) Date of Patent: May 28, 2024

(54) DRIVING DEVICE PROVIDED WITH PIEZOELECTRIC ELEMENT DETERIORATION DETECTION CIRCUIT AND DETERIORATION DETECTION METHOD

(71) Applicant: FUJIKIN INCORPORATED, Osaka (JP)

(72) Inventors: Atsushi Hidaka, Osaka (JP); Katsuyuki Sugita, Osaka (JP); Takatoshi Nakatani, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 326 days.

(21) Appl. No.: 17/604,982

(22) PCT Filed: Apr. 20, 2020

(86) PCT No.: PCT/JP2020/016998
§ 371 (c)(1),
(2) Date: Apr. 6, 2022

(87) PCT Pub. No.: WO2020/218226
PCT Pub. Date: Oct. 29, 2020

(65) Prior Publication Data
US 2023/0152263 A1   May 18, 2023

(30) Foreign Application Priority Data
Apr. 25, 2019   (JP) .................. 2019-084548

(51) Int. Cl.
*B06B 1/06* (2006.01)
*F16K 37/00* (2006.01)
*G01N 27/02* (2006.01)

(52) U.S. Cl.
CPC ....... *G01N 27/028* (2013.01); *F16K 37/0083* (2013.01)

(58) Field of Classification Search
CPC .................................................. G01N 27/028
See application file for complete search history.

(56) References Cited

U.S. PATENT DOCUMENTS

| 6,384,512 B1 * | 5/2002 | Maeda | H02N 2/06 310/316.03 |
| 2014/0320154 A1 * | 10/2014 | Arunachalam | G01D 3/08 324/750.3 |

(Continued)

FOREIGN PATENT DOCUMENTS

| JP | 4119109 B2 | 7/2008 |
| JP | 2009-116904 A | 5/2009 |

(Continued)

OTHER PUBLICATIONS

International Search Report issued in PCT/JP2020/016998; mailed Jul. 7, 2020.

*Primary Examiner* — Alesa Allgood
(74) *Attorney, Agent, or Firm* — Studebaker & Brackett PC

(57) ABSTRACT

The driving device includes a piezoelectric element, a power supply unit, a first resistor, a second resistor, a measuring unit and a control unit, wherein resistance values of the first resistor and the second resistor are smaller than an insulating resistance value of the piezoelectric element, the measuring unit measures, a voltage across the first resistor (voltage between a first terminal and a second terminal), in a state of supplying a predetermined voltage from the power supply unit, and the control unit calculates a resistance value of the piezoelectric element from a voltage value obtained by the measurement of the measuring unit, and determines, (Continued)

whether or not degradation has occurred in the piezoelectric element based on the calculated resistance value.

14 Claims, 8 Drawing Sheets

(56) References Cited

U.S. PATENT DOCUMENTS

| | | | |
|---|---|---|---|
| 2015/0369113 A1* | 12/2015 | Arbel | F01P 7/16 236/34.5 |
| 2019/0353276 A1 | 11/2019 | Ito et al. | |

FOREIGN PATENT DOCUMENTS

| | | | |
|---|---|---|---|
| JP | 2017-060356 A | | 3/2017 |
| JP | 2017-060357 A | | 3/2017 |
| JP | 2017060357 | * | 3/2017 |
| JP | 2017-118760 A | | 6/2017 |
| JP | 2017118760 | * | 6/2017 |
| JP | 2018-117461 A | | 7/2018 |

* cited by examiner

DRIVING DEVICE PROVIDED WITH PIEZOELECTRIC ELEMENT DETERIORATION DETECTION CIRCUIT AND DETERIORATION DETECTION METHOD

TECHNICAL FIELD

The present invention relates to a driving device provided with a deterioration detection circuit of a piezoelectric element used as a driving source of a driving device such as an actuator and a method of detecting deterioration of the piezoelectric element, and more particularly, to a control device used for supplying a fluid such as a gas in a semiconductor manufacturing facility or a chemical plant or the like, i.e., a pressure type flow rate control device having a deterioration detection circuit of the piezoelectric element, and a method of detecting deterioration of the piezoelectric element of the pressure type flow rate control device.

BACKGROUND ART

A pressure type flow rate control device used for supplying a fluid such as a gas in a semiconductor manufacturing facility, a chemical plant, or the like is known (Patent Documents 1, 2, and the like). A control valve using a piezoelectric element can be used as the pressure type flow rate control device. For example, Patent Document 1 below discloses a pressure type flow rate control device having a piezoelectric element driven metal diaphragm type control valve shown in FIG. 8 (hereinafter, simply referred to as a control valve). The control valve 100 includes a piezoelectric element 101, a connector 102 connected to a power supply (not shown) for suppling voltage to the piezoelectric element 101, and a diaphragm valve element 104 provided in a valve body 103. The piezoelectric element 101 is housed in a cylindrical support tube 105 and deformed in the longitudinal direction by on/off controlling of the supply of a predetermined voltage via the connector 102. The deformation of the piezoelectric element 101 causes the deformation of the diaphragm valve element 104, and thereby the opening and closing of the valve is performed.

The pressure type flow rate control device includes a throttle portion 106, such as an orifice, provided in a flow path 107 of a fluid G, under a critical expansion condition where an upstream pressure P1 of the throttle portion 106 is held at approximately twice or more of a downstream pressure P2 of the throttle portion 106, the upstream pressure P1 detected by a first pressure sensor 108 provided upstream of the throttle portion 106 is adjusted by the control valve 100 upstream of the throttle portion 106. Thus, as a basic principle, the flow rate Qc downstream of the throttle portion 106 is calculated by Qc=KP1, where K is a constant depending on the type of fluid and the fluid temperature, and the flow rate Qc is controlled to become a predetermined set value. Further, even when the difference between the upstream pressure P1 and the downstream pressure P2 is small, and the critical expansion condition is not satisfied, it is possible to detect the downstream pressure P2 by a second pressure sensor (not shown) provided downstream of the throttle portion 106, and to determine the flow rate by calculation. That is, it is possible to obtain the flow rate Q based on the upstream pressure P1 and downstream pressure P2 measured by the first pressure sensor 108 and the second pressure sensor, from Q=K2*P2m (P1-P2) n (where K2 is a constant depending on the type of the fluid and fluid temperature, m and n are index numbers derived from the actual flow rate), in addition, a reference numeral 109 in FIG. 8 indicates a control circuit board (control unit).

The control valve as described above is continuously used for a long time in a semiconductor manufacturing facility, a chemical plant, or the like, Though the piezoelectric element used for the control valve fails by aged deterioration, it can not be predicted when the control valve fails due to the deterioration of the piezoelectric element.

The control valve is also used for the supply of gas or the like containing moisture, the life of the piezoelectric element is greatly different depending on whether or not the use environment containing moisture. Some control valves are filled with a member (moisture adsorbent) for absorbing moisture in the case containing the piezoelectric element. Therefore, even when the control valve is used for the same period of time and the same number of opening and closing times, the degree of the deterioration of the piezoelectric element differs depending on the environment, in which the control valve is used (i.e., the environment in which the piezoelectric element is used), and whether or not the piezoelectric element is provided with the moisture adsorbent. Therefore, it is difficult to predict the deterioration of the piezoelectric element and the replacement timing of the pressure type flow rate control device.

Due to the deterioration of the piezoelectric element, the control valve cannot control the flow rate as scheduled, and if it fails, the fluid may not be able to be supplied. If the control valve is replaced after a failure, the equipment will be shut down at an unscheduled timing. To prevent this, it is possible to replace the control valve at regular intervals. However, it will cause the replacement of a control valve even the piezoelectric element provided therein has not yet failed.

The Patent Document 3 described below discloses a piezoelectric actuator for detecting an abnormality of the piezoelectric element in advance. The piezoelectric actuator includes an abnormality detection circuit separate from the drive circuit for normal operation, and a switch for switching the drive circuit and the abnormality detection circuit. Before operating the piezoelectric actuator, the switch is switched to determine whether an abnormality has occurred in the piezoelectric element by the abnormality detection circuit. If there is no abnormality, the switch is switched to operate the piezoelectric actuator by the drive circuit.

PRIOR-ART DOCUMENT

Patent Literature

Patent Document 1: Japanese Patent No, 4119109
Patent Document 2: Japanese Laid-Open Patent Application No. 2009-116904
Patent Document 3: Japanese Laid-Open Patent Application No, 2017-060356

SUMMARY OF INVENTION

Technical Problem

As described above, it is preferable that the deterioration of the piezoelectric element can be detected in advance and the control valve can be replaced before its deterioration or failure. For this purpose, it is necessary to detect the deterioration of the piezoelectric element itself.

In Patent Document 3, even it is possible to detect the deterioration of the piezoelectric element, an abnormality detection circuit must be provided separately from the drive circuit for a normal operation, and there are problems that the configuration becomes complicated and the cost increases. Further, before performing the normal operation, it is necessary to determine the presence or absence of abnormality of the piezoelectric element by the abnormality detection circuit, there is a problem that it can not be applied to equipment continuously used for a long period in a semiconductor manufacturing facility or a chemical plant or the like.

An object of the present invention is to solves the above problems, and to provide a driving device having a piezoelectric element deterioration detection circuit that can detect deterioration of the piezoelectric element used in the driving device, without stopping the normal operation of the driving device, and a deterioration detection method.

Solution of Problem

To achieve the above object, the driving device according to a first embodiment of the present invention includes a piezoelectric element, a first resistor connected in series with the piezoelectric element, a voltage supply unit for supplying a DC voltage across the series connection circuit formed by the piezoelectric element and the first resistor, a measuring unit for measuring a voltage of the first resistor, and a control unit for controlling the voltage supply unit and the measuring unit, wherein the resistance value of the first resistor is smaller than an insulation resistance value of the piezoelectric element, the measuring unit measures the voltage of the first resistor, in a state where a predetermined voltage is supplied from the voltage supply unit, and the control unit calculates a resistance value of the piezoelectric element from the voltage value obtained by measurement of the measuring unit, and determines whether or not deterioration has occurred in the piezoelectric element based on the calculated resistance value.

The measuring unit measures the voltage of the first resistor for a plurality of times, in a state where the predetermined voltage is supplied from the voltage supply unit, and the control unit calculates the resistance value of the piezoelectric element from each of the plurality of voltage values obtained by the plurality of measurements, calculates a representative value of the plurality of calculated resistance values of the piezoelectric element, and determines whether or not deterioration has occurred in the piezoelectric element by comparing the representative value with a predetermined threshold.

The measuring unit can measure the voltage of the first resistor for a plurality of times, in a state where the predetermined voltage is supplied from the voltage supply unit, and the control unit can conduct repeatedly a process of calculating the resistance value of the piezoelectric element from each of a plurality of voltage values obtained by a plurality of measurements, and a process of calculating a representative value of the plurality of calculated resistance values of the piezoelectric element, calculate a slope of the plurality of calculated representative values, and determine whether or not deterioration has occurred in the piezoelectric element by comparing the slope with a predetermined threshold value.

The measuring unit can determine whether or not deterioration has occurred in the piezoelectric element in response to the fact that a predetermined period of time has elapsed after the voltage is first applied to the piezoelectric element.

The above driving device may have a mechanism for opening and, closing a valve by the piezoelectric element, and the measuring unit may determine whether or not deterioration has occurred in the piezoelectric element in response to the fact that the number of times of opening and closing the valve has exceeded a predetermined number of times.

Preferably, the above driving device further includes a second resistor, wherein the second resistor is connected in series with the piezoelectric element and the first resistor, the second resistor is connected between a positive terminal of the voltage supply unit and the first resistor, and a resistance value of the second resistor is smaller than the insulation resistance value of the piezoelectric element and larger than the resistance value of the first resistor.

A deterioration detection method according to a second aspect of the present invention is a method of detecting deterioration of a piezoelectric element in the driving device including the piezoelectric element, a first resistor connected in series with the piezoelectric element, a voltage supply unit for supplying a DC voltage, and a measuring unit for measuring the voltage including a step of supplying, by the voltage supply unit, a predetermined DC voltage across the series connection circuit formed by the piezoelectric element and the first resistor, a measurement step of measuring a voltage of the first resistor by the measuring unit, in a state of supplying the predetermined DC voltage, a calculation step of calculating a resistance value of the piezoelectric element from the voltage value obtained by the measurement step, and a step of determining whether or not deterioration has occurred in the piezoelectric element, based on the resistance value calculated by the calculation step.

Advantageous Effect of Invention

According to the present invention, whether or not the piezoelectric element is deteriorated may be determined without affecting the normal operation of the driving device. That is, since the detection circuit is provided in the middle of a wiring for normally controlling the piezoelectric element, so as not to affect the normal control, it is possible to determine the presence or absence of deterioration of the piezoelectric element during normal control without providing an extra equipment or circuit. Therefore, whether or not the driving device itself should be replaced may be determined during normal control of the driving device.

In addition, whether or not degradation of the piezoelectric element has occurred and whether or not the driving device should be replaced may be determined regardless of the applying environment of the driving device (piezoelectric element) and whether or not the driving device is provided with a moisture adsorbent.

Further, the presence or absence of deterioration of the piezoelectric element may also be determined when stopping the driving device, or when the gas supply is completed.

When determining the presence or absence of deterioration of the piezoelectric element by comparing a resistance value of the piezoelectric element calculated from one measurement with a predetermined threshold value, erroneous determination of deterioration may occur even when the resistance value exceeds the threshold value by accident. On the other hand, erroneous determination may be prevented by comparing the calculated representative value (e.g., average value) of the plurality of resistance values, or the tendency (e.g., slope) of the representative value with a predetermined reference (threshold value).

DESCRIPTION OF EMBODIMENTS

Figure 1:
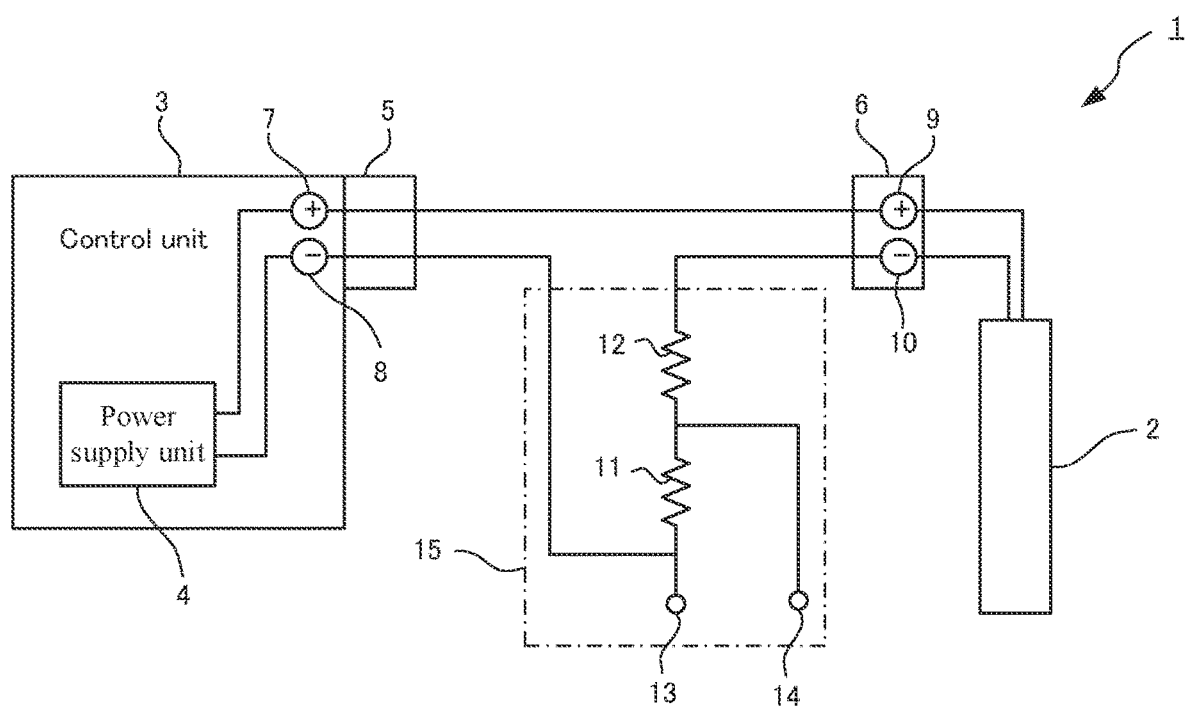
FIG. 1 is a block diagram showing a schematic configuration of a driving device provided with a piezoelectric element deterioration detection circuit according to an embodiment of the present invention.

Embodiments of a driving device provided with a piezoelectric element deterioration detection circuit and a deterioration detection method according to the present invention will be described with reference to the drawings below. The same or similar components are denoted by the same reference numerals throughout the drawings and the embodiments.

FIG. 1 shows a driving device provided with a piezoelectric element deterioration detecting circuit according to an embodiment of the present invention. The driving device 1 is, for example, a pressure type flow rate control device. The driving device 1 includes a piezoelectric element 2, a control unit 3, a power supply unit 4, a first connector 5, a second connector 6, a first positive terminal 7, a first negative terminal 8, a second positive terminal 9, a second negative terminal 10, a first resistor 11, a second resistor 12, a first terminal 13 and a second terminal 14.

The power supply unit 4 is included in the control unit 3. The first positive terminal 7 and the second positive terminal 9 are electrically connected by electrical wiring. Hereinafter, unless otherwise specified, the term "connection" means electrical connection. The first negative terminal 8 is connected to the second negative terminal 10 via the first resistor 11 and the second resistor 12 connected in series. The piezoelectric element 2 may be composed of one piezoelectric body, or may be composed of a plurality of piezoelectric bodies constructed by laminating.

The power supply unit 4 outputs a DC voltage (hereinafter simply referred to as a voltage) of a predetermined magnitude. Thus, the predetermined voltage is applied between the second positive terminal 9 and the second negative terminal 10 via the first positive terminal 7 and the first negative terminal 8, so that the piezoelectric element 2 deforms. Therefore, it may cause deformation or displacement of a displacement portion (such as a diaphragm valve element) to control the operation of the driving unit (opening and closing of the valve, etc.), and, for example, to control the supply of a fluid such as a gas.

Both ends of the first resistor 11 are respectively connected to the first terminal 13 and the second terminal 14. Thus, the first resistor 11, the second resistor 12, the first terminal 13 and the second terminal 14 constitute a deterioration detection circuit 15. The first resistor 11 and the second resistor 12 are voltage dividing resistors for dropping the voltage of the second terminal 14 to a voltage value that can be input to a measuring device, which will be described later.

Figure 2:
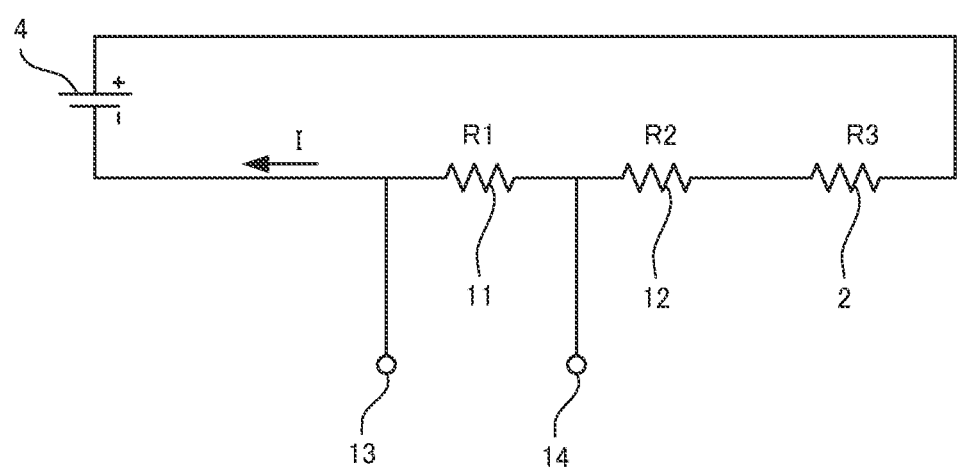
FIG. 2 is a circuit diagram showing an equivalent circuit of a circuit for supplying a voltage to the piezoelectric element of FIG. 1.

FIG. 2 shows an equivalent circuit of a circuit including the power supply unit 4, the piezoelectric element 2, the first resistor 11 and the second resistor 12 of FIG. 1. Each resistance value of the first resistor 11, the second resistor 12 and the piezoelectric element 2 is respectively denoted by R1, R2 and R3. The first resistor 11, the second resistor 12 and the piezoelectric element 2 are connected in series, and a predetermined voltage is supplied from the power supply unit 4 across the formed series circuit.

An insulation resistance of the piezoelectric element 2 that is not deteriorated is very large, the resistance value R3 is, for example, $R3 > 1 \times 10^9$ ($\Omega$)=$1 \times 10^3$ (M$\Omega$). As the first resistor 11 and the second resistor 12, resistance values that are sufficiently smaller than the resistance value R3 of the piezoelectric element 2 under a non-deteriorated state are used ($R1 \ll R3$, $R2 \ll R3$). Here, $R1 = 10$ k$\Omega$, $R2 = 39$ k$\Omega$.

When the voltage between the first terminal 13 and the second terminal 14 is represented by V1, the current I flowing through the circuit of FIG. 2 becomes $I = V1/R1$. Therefore, if $R1 \ll R3$, $R2 \ll R3$, when the output voltage value of the power supply unit 4 is VU, the resistance value R3 of the piezoelectric element 2 can be obtained by $R3 \times V0/I = V0/(V1/R1)$. That is, in a state of supplying a predetermined voltage (VU) from the power supply unit 4, by measuring the voltage (V1) between the first terminal 13 and the second terminal 14, the resistance value of the piezoelectric element 2 may be calculated from the measured voltage.

With respect to the piezoelectric element 2, when voltage is repetitively applied for a long time, the piezoelectric element 2 will be deteriorated, and the insulation resistance value will be lowered. Therefore, in a state of normally operating the driving device 1 and supplying a predetermined voltage from the power supply unit 4, the presence or absence of deterioration of the piezoelectric element 2 may be determined by measuring the voltage between the first terminal 13 and the second terminal 14, calculating the resistance value R3 of the piezoelectric element 2, and comparing the calculated value (R3) with a predetermined threshold value Rth. For example, it can be determined that the piezoelectric element 2 is not deteriorated when $R3 \geq Rth$, and deterioration has occurred in the piezoelectric element 2 when $R3 < Rth$.

Figure 3:
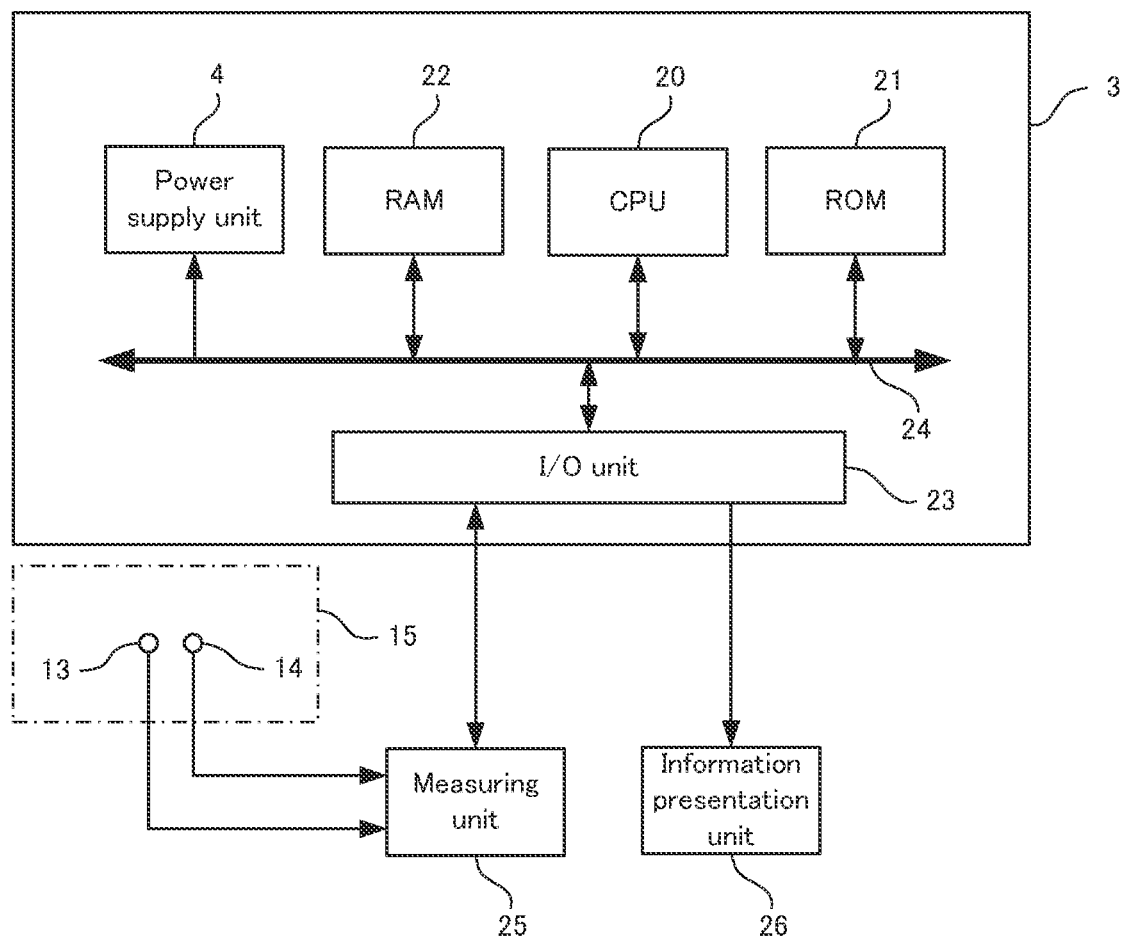
FIG. 3 is a block diagram showing a control portion related to the deterioration detection of the piezoelectric element.

The method of detecting the deterioration of the piezoelectric element 2 will be described in more details. Of the configuration of the driving device 1, a configuration related to the detection of deterioration of the piezoelectric element 2 is shown in FIG. 3. Referring to FIG. 3, the control unit 3 controls the entire driving device 1 to normally operate. The control unit 3 is configured with a CPU (Central Processing Unit) 20, an ROM (Read Only Memory) 21, an RAM (Random Access Memory) 22, an I/O unit 23, a bus 24 and a power supply unit 4.

An external measuring unit 25 and an information presentation unit 26 are connected to the I/O unit 23. Here, with respect to the deterioration detection circuit 15, only the first terminal 13 and second terminal 14 are shown, other components are not shown.

The CPU 20 realizes the function of the driving device 1 by executing a program recorded in the ROM 21. The ROM 21 is, for example, an electrically writable non-volatile memory that stores the predetermined program and the data required to execute the program. The required data are, for example, the determination threshold Rth, the voltage value V0 supplied from the power supply unit 4 to the piezoelectric element 2, the resistance value R1 of the first resistor 11 and the like. The RAM 22 is a volatile memory being used as a work area when CPU 20 executes the program and for temporarily storing the value of the calculation result.

The I/O unit 23 is an interface for exchanging data with the outside of the control unit 3 (the measuring unit 25 and the information presentation unit 26). The CPU 20 outputs a signal for causing the measuring unit 25 to start measuring (control code or the like, hereinafter, also referred to as a measurement start signal), to the measuring unit 25 via the I/O unit 23. The I/O unit 23 acquires data (measurement data) outputted from the measuring unit 25, and stores the data (measurement data) in the RAM 22. Further, the I/O unit 23 outputs predetermined data outputted from the CPU 20 to the information presentation unit 26.

Although not shown, the I/O unit 23 may include an interface for exchanging information with an external device such as a computer. This allows program and data to be written to the ROM 21 through the interface with the external device. In the case where an interface with the external device is not provided, if the ROM 21 is configured to be removable, programs and parameters can be updated by replacing the ROM 21 with a new one. It is also possible to update the data of the removed ROM 21 using an external device.

The buses 24 are parallel electric wirings for exchanging data among the CPU 20, the ROM 21, the RAM 22, the I/O unit 23, and the power supply unit 4. Further, although not shown in FIGS. 1 and 3, the driving device 1 also includes components necessary for its operation, such as a clock signal generator for operating the respective units in synchronization.

The measurement terminal of the measuring unit 25 is connected to the first terminal 13 and second terminal 14 of the deterioration detection circuit 15. The measuring unit 25 measures the voltage between the first terminal 13 and the second terminal 14 upon receiving the measurement start signal from the CPU 20. The measuring unit 25 is, for example, a known tester or data logger capable of measuring the voltage.

The information presentation unit 26 can present information and is, for example, a display device (liquid crystal panel, LED panel, etc.) capable of displaying information such as text, or a lighting device (LED lamp, etc.).

Being configured in this way, the driving device 1 can drive the driving unit by supplying a voltage from the power supply unit 4 to the piezoelectric element 2, at a predetermined timing set by the CPU 20. Further, while supplying a voltage from the power supply unit 4 to the piezoelectric element 2, the measuring unit 25 is controlled by the CPU 20, the voltage between the first terminal 13 and the second terminal 14 (voltage across the first resistor 11) is measured, and as described above, it is possible to determine the presence or absence of deterioration of the piezoelectric element 2 by calculating the resistance value R3 of the piezoelectric element 2.

Figure 4:
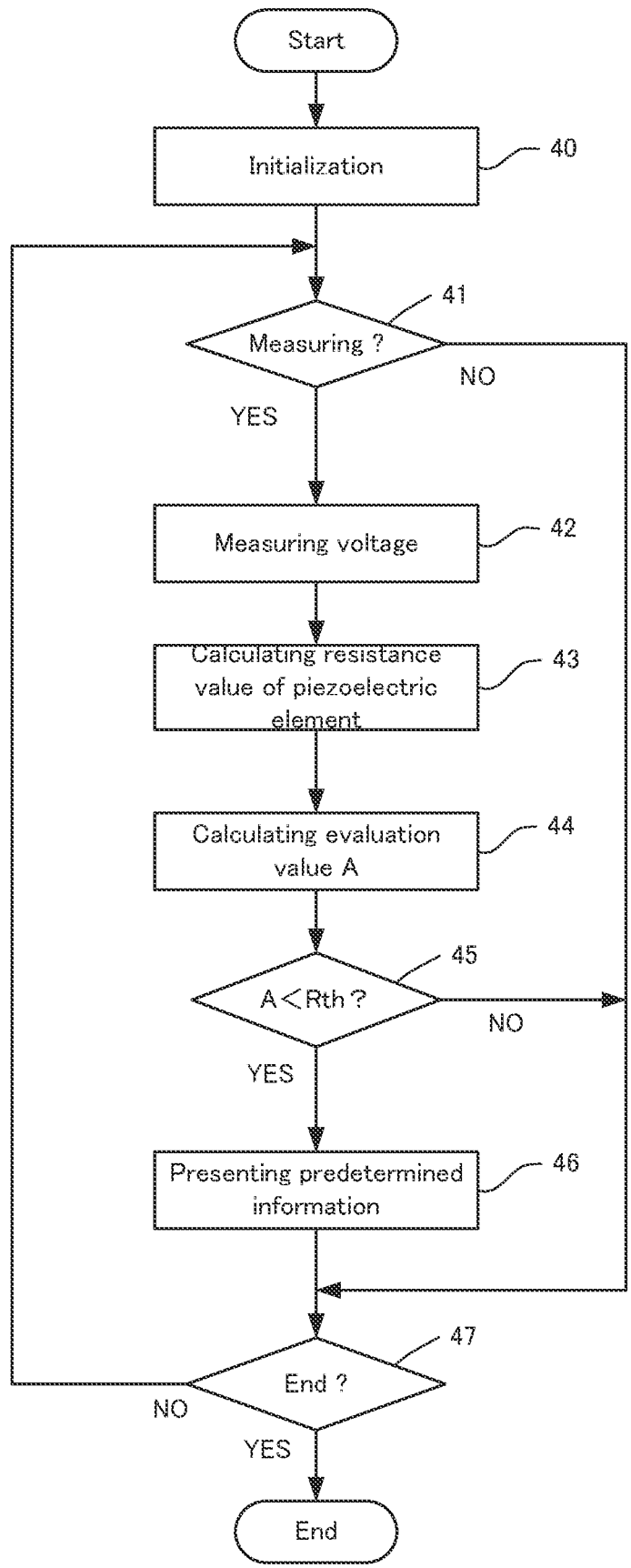
FIG. 4 is a flowchart showing a deterioration detection method of the piezoelectric element.

Referring to the flowchart of FIG. 4, a method for detecting deterioration of the piezoelectric element 2 in the driving device 1 will be described. Each step of the flow chart of FIG. 4 is realized by turning on the power of the driving device 1 and causing the CPU 20 to execute predetermined programs read out from ROM 21. Here, it is assumed that the CPU 20 reads a control program (hereinafter, also referred to as a normal drive program) for normally operating the driving device 1 and a control program (hereinafter, also referred to as a detection program) for detecting deterioration of the piezoelectric element 2, and executes these control programs in parallel. FIG. 4 shows the detection program, and does not include the normal drive program.

In step 40 of the detection program, the CPU 20 performs the initialization. For example, the CPU 20 reads out a predetermined threshold value (Rth) from the ROM 21 to the RAM 22, secures an area to be used as a counter in the RAM 22, reads out a value indicating the number of times the driving unit of the driving device 1 was driven (hereinafter, referred to as the number of driving times, for example, in the case of a control valve, the number of times of opening and closing the valve) stored in the ROM 21, and sets the value as an initialization value of the counter. The counter is incremented by "1" each time the driving unit of the driving device 1 is driven by the normal drive program executed by the CPU 20. When the power supply of the driving device 1 is turned off, the present value of the counter in the RAM 22 is stored in advance in the ROM 21 as the number of driving times.

In step 41, the CPU 20 determines whether or not to measure the voltage of the first resistor 11 by the measuring unit 25. If it determines to perform the voltage measurement, the control proceeds to step 42, otherwise, the control proceeds to step 47. The voltage measurement is performed by determining whether the value of the counter exceeds a predetermined value. For example, if the value exceeds an integer multiple of a predetermined number of times (500,000 times, 1,000,000 times, etc.), it determines to execute the voltage measurement. Otherwise, it determines not to execute the voltage measurement.

In step 42, the CPU 20 performs the voltage measurement by the voltage measuring unit 25. Specifically, the CPU 20 outputs the measurement start signal to the measuring unit 25 via the I/O unit 23, while supplying the predetermined voltage (V0) from the power supply unit 4 to the piezoelectric element 2. The measuring unit 25, upon receiving the measurement start signal, performs repeated voltage measurement at predetermined time intervals. The measuring unit 25 outputs the measurement data V1 to the I/O unit 23, and the I/O unit 23 stores the received data in the RAM 22.

When stopping the operation of the driving unit, prior to stopping the voltage supply from the power supply unit 4 to the piezoelectric element 2, the CPU 20 outputs a control signal for instructing the measurement stop (hereinafter, referred to as measurement stop signal) to the measuring unit 25 via the I/O unit 23. Once receiving the measurement stop signal, the measuring unit 25 stops the voltage measurement. The method, in which the measuring unit 25 outputs the measurement data to the I/O unit 23, is arbitrary. For example, the measuring unit 25 may output the measurement data to the I/O unit 23 every time the measurement data is obtained, or may temporarily store the measurement data in a storage unit (such as a buffer) in the measuring unit 25, and collectively output the measurement data to the I/O unit 23 when the measurement stop signal is received, or when the amount of the temporarily stored measurement data reaches a predetermined amount.

As described above, since the normal drive program is executed simultaneously with the main detection program, the supply of the voltage from the power supply unit 4 and the stoppage thereof can be transmitted from the normal drive program to the main detection program by interruption or the like.

In step 43, the CPU 20 reads out the measurement data (V1) from the RAM 22, and calculates the resistance value of the piezoelectric element 2 from each of the measurement data Vii (i is a data number, and i=1 to n). Specifically, representing the calculated value of the resistor by Ri, it is calculated by Ri=V0/(V1i/R1). V0 and R1 are values read out from the ROM 21, and are respectively the voltage supplied to the piezoelectric element 2 and the resistance value of the first resistor 11. The calculated resistances values Ri (i=1 to n) are stored in the RAM 22.

In step 44, the CPU 20 reads out the resistance values Ri (i=1 to n) calculated in step 43 from the RAM 22, and calculates an evaluation value A for determining the presence or absence of deterioration of the piezoelectric device 2. The evaluation value A is a value representing the set of calculated resistance values Ri (i=1 to n), for example, an average value of Ri (i=1 to n), a median value (median), and the like.

Figure 5:
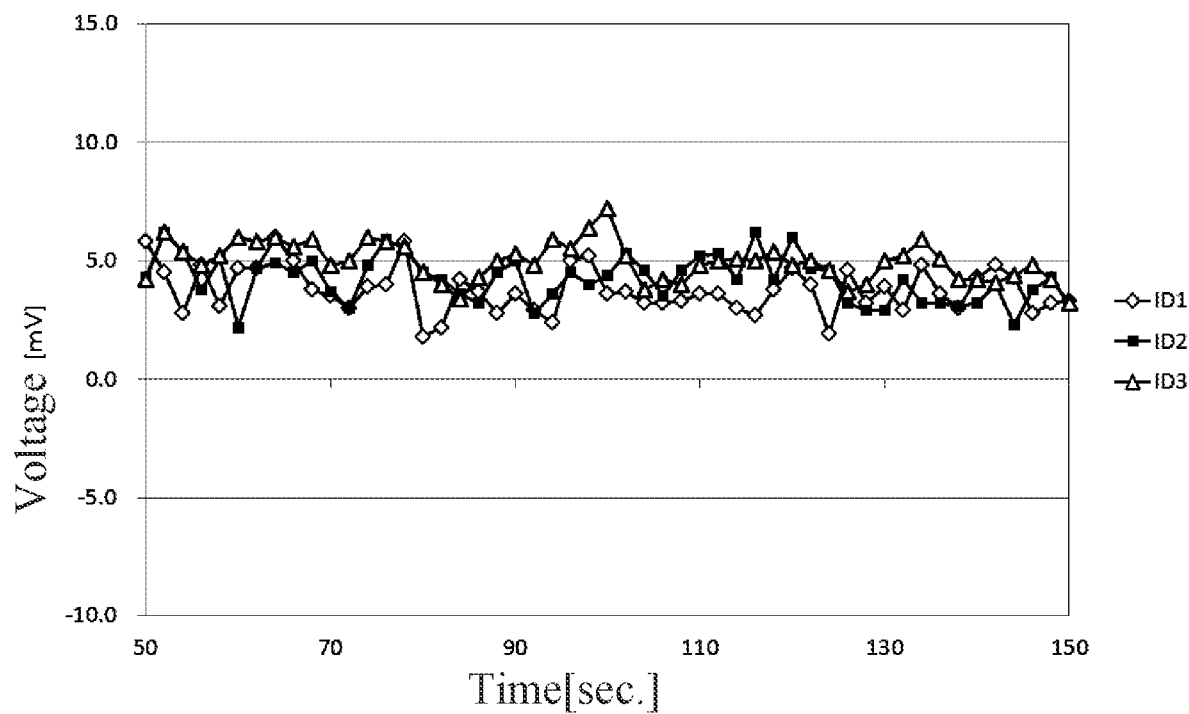
FIG. 5 is a graph showing a measurement result by a data logger.

FIG. 5 shows an example of the measured result of the resistance value of the first resistor 11. As will be described later, for each of the three types of the piezoelectric elements 2 (shown by ID1 to ID3), the voltage was measured by the data logger at intervals of 2 seconds. The vertical and horizontal axes represent voltage (in mV) and time (in seconds) respectively. FIG. 5 shows data in 100 seconds. As can be seen from FIG. 5, since the resistance value of the first resistor 11 fluctuates with a certain width, it is preferable to calculate a representative value (e.g., an average value) of a plurality of measured values during a predetermined time and compare the value with the threshold value, rather than comparing one-time measured value with the threshold value.

In step 45, the CPU 20 reads out the threshold value Rth from the RAM 22, and determines whether or not the evaluation value A calculated in step 44 is smaller than the threshold value Rth. If A<Rth, the control proceeds to step 46; otherwise (A≥Rth), the control proceeds to step 47.

In step 46, the CPU 20 reads out the predetermined information from the ROM 21 and outputs the read-out information to the information presentation unit 26 through the I/O unit 23. The predetermined information is information indicating the possibility of deterioration of the piezoelectric element 2. If the information presentation unit 26 is a liquid crystal display device, it is text data ("the piezoelectric element of the driving device is deteriorated," "replace the driving device," or the like), and if the information presentation unit 26 is a lighting device, it is a signal for instructing the lighting. By the lighting of the lighting device, it can be indicated that the piezoelectric element of the driving device is deteriorated and replacement of the driving device is required.

In step 47, the CPU 20 determines whether or not an end instruction has been issued, and if the end instruction has been received, ends the detecting program, otherwise, the control returns to step 41. The end instruction is issued by, for example, the power switch OFF of the driving device 1.

Thus, during a normal operation of the driving device 1, and in a state where a voltage is applied to the piezoelectric element 2, by measuring the voltage across the first resistor 11 and calculating the resistance value of the piezoelectric element 2, it is possible to determine the presence or absence of deterioration of the piezoelectric element 2. If the threshold Rth is appropriately set, by repeating the voltage measurement and the determination of deterioration in accordance with an increase in the number of driving times of the driving unit of the driving device 1, it is possible to detect the occurrence of the deterioration of the piezoelectric element land to recommend the replacement of the piezoelectric element 2 or the driving device 1 having the piezoelectric element 2, before the driving device 1 becomes unable to operate normally.

As shown in FIG. 5, since the measured voltage value fluctuates (vibrates), the resistance value of the calculated piezoelectric element also fluctuates. Therefore, when the resistance value calculated from one measurement is compared with the predetermined threshold value to determine a deterioration, erroneous determination of deterioration may occur even if the resistance value accidentally exceeds the threshold value. On the other hand, as described above, by comparing the representative value (e.g., average value) of a plurality of calculated resistance values of the piezoelectric element with a predetermined reference (threshold value), erroneous determination may be suppressed.

In the above description of step 41, the case where whether or not to perform the voltage measurement is determined by the number of driving times has been described, but the present invention is not limited thereto. Whether or not to perform the voltage measurement may be determined by time. In this case, when the elapsed time from the driving device 1 first started operating (supplying voltage to the piezoelectric element 2) exceeds a specified time, it is determined to perform the measurement, and steps 42 to 45 may be executed.

In the above description, the case of using, the representative value (e.g., average value) of a plurality of measured values as the evaluation value has been described, but the present invention is not limited thereto. A tendency of change in the representative value may be compared with a predetermined reference (threshold value). For example, the rate of change (a slope) of the representative values may be calculated as the evaluation value. In this case, the representative value calculated every time the step 44 is executed as described above may be stored in the RAM 22 (when the power is turned off, the representative values are stored in the ROM 21 in advance). After the voltage is measured and the representative value is calculated, the previously calculated representative values are read out from the RAM 22, the slope is calculated, and the calculated slope is used as the evaluation value to be compared with the predetermined threshold value. As shown in the experimental results to be described later, if the piezoelectric element 2 is deteriorated, the resistance value R3 continues to decrease with a certain degree of inclination from the state where it is not deteriorated (R3>1×103 (MΩ)). Therefore, using the change of the representative value (slope), it is possible to determine the presence or absence of deterioration of the piezoelectric element 2.

Note that a known method may be used for calculating the tendency of change in representative value. For example, the slope may be obtained from two calculated consecutive representative values. Further, a regression line (slope) may be obtained by applying the least squares method or the like to the calculated three or more representative values.

Further, the representative value or the tendency of the representative value may be one of the determination conditions, thereby, it is possible to detect the deterioration of the piezoelectric element more accurately.

In the above description, the case where the resistance values R1 and R2 of the first resistor 11 and the second resistor 12 connected in series to the piezoelectric element 2 are set as R1=10 kΩ and R2=39 kΩ has been described, but the present invention is not limited thereto. R1 and R2 can be selected in accordance with the input range of the measuring device for measuring the voltage across the first resistor 11 (the region of the resistance value to be measured), and may be sufficiently smaller than the resistance value R3 of the piezoelectric element 2, to an extend that R1 and R2 may be ignored when calculating the resistance value of the piezoelectric element 2.

In the above description, the case of calculating the resistance value (Ri) of the piezoelectric element 2 from the respective measured data V1i, according to Ri=V0/(V1i/R1) (V0 being the output voltage of the power supply unit 4) has been described, but the present invention is not limited thereto. Referring to FIG. 2, using the measured value V1 of the voltage across the first resistor 11, since V0=(R1+R2+R3)×I=(R1+R2+R3)×(V1/R1), R3=V0/(V1/R1)−R1−R2). Therefore, the resistance value (Ri) of the piezoelectric element 2 may be calculated according to Ri−V0/(V1i/R1)−R1−R2 from the measured data V1i. In this case, the values of R1 and R2 may not satisfy R1<<R3, R2<<: R3.

In the above description, the case of providing the deterioration detection circuit 15 on the electrical wiring between the output end of the negative electrode side of the power supply unit 4 and the piezoelectric element 2 has been described, but the present invention is not limited thereto. The deterioration detection circuit may be provided on the electrical wiring between the output end of the positive electrode side of the power supply unit 4 and the piezoelectric element 2. Also in this case, the first resistor 11, the second resistor 12 and the piezoelectric element 2 are connected in series. Note that in order to realize the same voltage division as the circuit shown in FIG. 1, the second resistor 12 is preferably provided closer to the positive electrode side of the power supply unit 4 than the first resistor 11.

Figure 6:
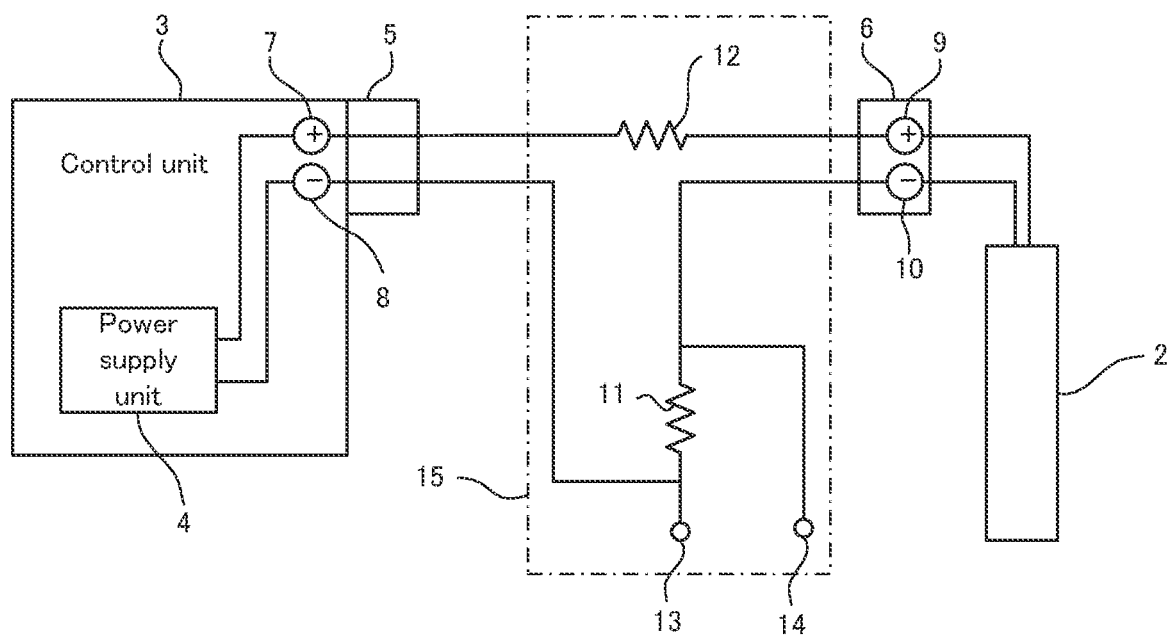
FIG. 6 is a block diagram showing a schematic configuration of a driving device provided with a deterioration detection circuit different from that of FIG. 1.

Further, as shown in FIG. 6, the first resistor 11 and the second resistor 12 may be disposed on both sides of the piezoelectric element 2. Further, the second resistor 12 may not be provided depending on the measuring device used for measuring the voltage across the first resistor 11.

Example 1

The experimental results are shown below to show the effectiveness of the present invention.

In the pressure type flow rate control device having the configuration shown in FIG. 1, the voltage across the first resistor 11 (the voltage between the first terminal 13 and the second terminal 14) was measured in a state where a DC voltage of 140V was supplied to the piezoelectric element 2, and the average value thereof was calculated. The resistance values of the first resistor 11 and the second resistor 12 were 10 kΩ and 39 kΩ respectively. In the voltage measurement, a tester (digital multimeter 289 manufactured by FLUKE Corporation) and a data logger (mobile recorder MV200 manufactured by Yokogawa Electric Corporation) were used.

In each of the three pressure type flow rate control devices of the same type using the same piezoelectric elements (ID1 to ID3), after opening and closing the control valve 3 million times, the voltages were measured using the above two types of measuring devices. The measured voltages of the first resistor 11, and the resistance values of the piezoelectric element 2 calculated therefrom are shown in Table 1.

TABLE 1

| Measuring apparatus | ID | 1 | 2 | 3 |
|---|---|---|---|---|
| Tester | Average value of measured voltages[mV] | 4.5 | 1.0 | 6.4 |
| | Fluctuation of average value of measured voltages[mV] | 2.8~6.1 | −2.0~4.0 | 3.8~9.0 |
| | Calculated resistance value[MΩ] | 333 | 1500 | 234 |
| Data logger | Average value of measured voltages[mV] | 3.84 | 4.32 | 5.04 |
| | Calculated resistance value[MΩ] | 391 | 347 | 297 |

The measurement conditions according to the data logger were the measurement range ±20 mV and the sampling period of 2 seconds. The measurement voltage average value (my) is the average value of the measurement data for 100 seconds. FIG. 5 shows the voltage values of 100 seconds measured using the data logger. As can be seen from FIG. 5, the fluctuation range of the measured voltages by the data logger was about 5 mV.

Example 2

Regarding the pressure type flow rate control devices using different types of piezoelectric elements, similarly to Example 1, the resistance values of the piezoelectric element used in the respective pressure type flow rate control device were calculated by measuring the voltage across the first resistor 11. The results are shown in FIG. 7.

Figure 7:
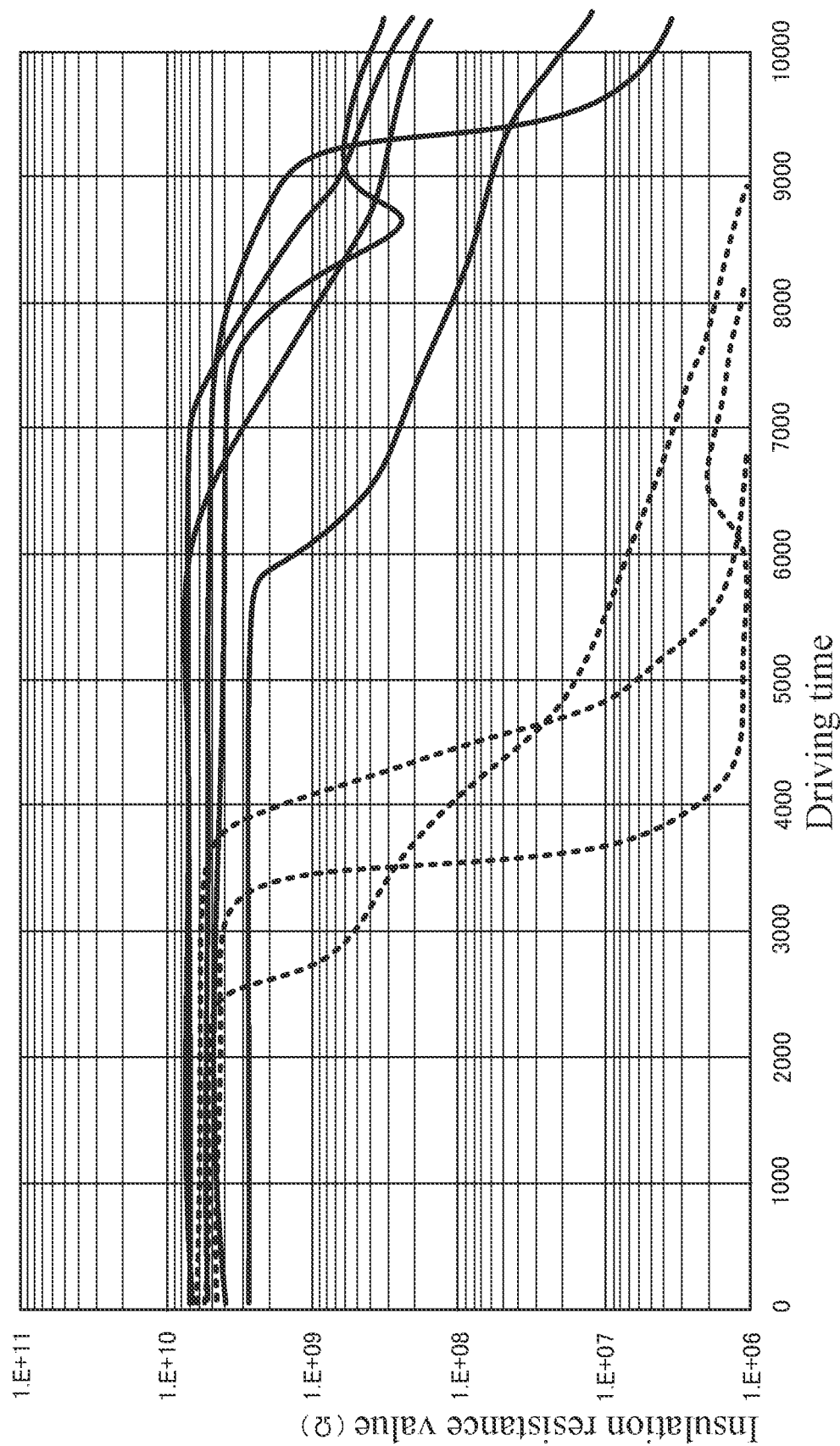
FIG. 7 is a graph showing the resistance value of the piezoelectric element calculated from the measurement result.
Figure 8:
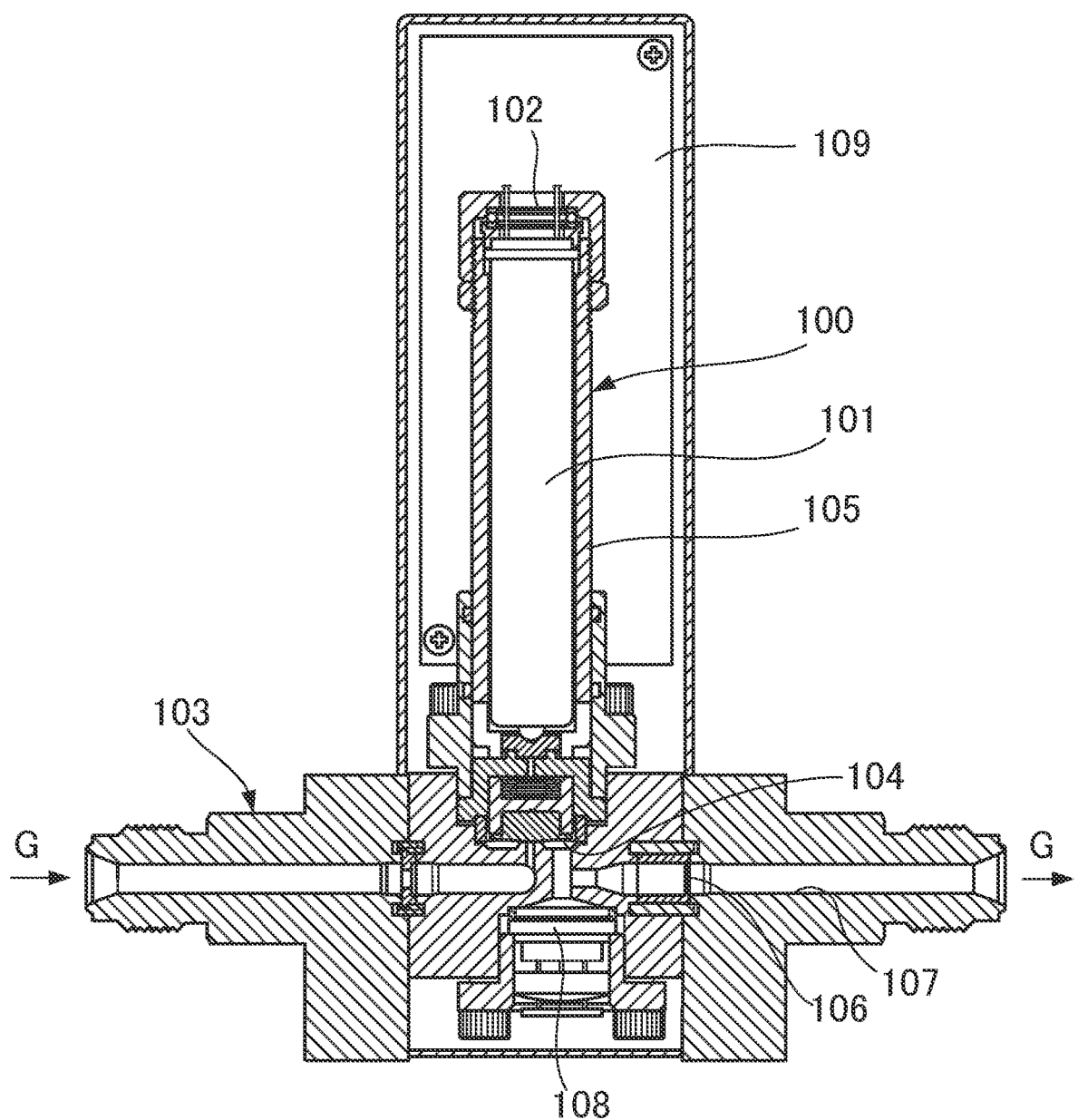
FIG. 8 is a longitudinal sectional view showing a configuration of a conventional piezoelectric element driven metal diaphragm type control valve.

FIG. 7 schematically shows the changes in the resistance values calculated from the measured values for each piezoelectric element. In FIG. 7, the vertical axis represents the resistance value of the piezoelectric element (calculated value), the horizontal axis represents the driving time of the control valve. As the driving time increases, the number of the opening and closing times of the control valve (the number of the applying times of the voltage to the piezoelectric element) increases. The solid lines are the measurement results of the control valves equipped with the moisture adsorbent, and the dashed lines are the measurement results of the control valves without the moisture adsorbent. As can be seen from the graph of FIG. 7, although the insulation resistance value of the piezoelectric element varies depending on the types, when the driving time becomes longer and deterioration occurs, the resistance value of any piezoelectric element decreases from the initial insulation resistance (around 1×1010Ω). The timing at which the insulation resistance value of the piezoelectric element starts to decrease varies depending on the presence or absence of the moisture adsorbent. It can be seen that, by providing the moisture adsorbent, the start of the decrease of the insulation resistance value is delayed, that is, the deterioration of the piezoelectric element is delayed.

As mentioned above, although the present invention was described by describing the embodiments, the above-mentioned embodiments are only examples, the present invention is not limited to the above-mentioned embodiments and can be variously modified and executed.

REFERENCE SIGNS LIST

1 Driving device
2 Piezoelectric element
3 Control unit
4 Power supply unit
5 First connector 6 Second connector
7 First positive terminal
8 First negative terminal
9 Second positive terminal
10 Second negative terminal
11 First resistor
12 Second resistor
13 First terminal
14 Second terminal
15 Deterioration detection circuit
20 CPU
21 ROM
22 RAM
23 I/O unit
24 Bus
25 Measuring unit
26 Information presentation unit
100 Control valve
110 Piezoelectric element
102 Diaphragm valve element
115 connector
123 Support tube

The invention claimed is:

1. A driving device comprising:
a piezoelectric element;
a first resistor connected in series with the piezoelectric element;
a voltage supply unit for supplying a DC voltage across the series connection circuit formed by the piezoelectric element and the first resistor;
at least one controller configured to:
control the voltage supply unit,
obtain a plurality of measurements by measuring a voltage of the first resistor a plurality of times, in a state where a predetermined voltage is supplied from the voltage supply unit,
calculate a resistance value of the piezoelectric element from each of a plurality of voltage values obtained by the plurality of measurements,
calculate a representative value of the plurality of calculated resistance values of the piezoelectric element, the representative value being an average or median of the plurality of calculated resistance values of the piezoelectric element, and
determine whether or not deterioration has occurred in the piezoelectric element, based on the representative value, wherein
the resistance value of the first resistor is smaller than an insulation resistance value of the piezoelectric element.

2. The driving device according to claim 1, wherein
the controller is configured to:
determine whether or not deterioration has occurred in the piezoelectric element by comparing the representative value with a predetermined threshold value.

3. The driving device according to claim 1, wherein
the controller is configured to determine whether or not deterioration has occurred in the piezoelectric element in response to the fact that a predetermined period of time has elapsed after the voltage is first applied to the piezoelectric element.

4. The driving device according to claim 1, wherein
the driving device has a mechanism for opening and closing a valve by the piezoelectric element, and
the controller is configured to determine whether or not deterioration has occurred in the piezoelectric element in response to the fact that the number of times of opening and closing the valve has exceeded a predetermined number of times.

5. The driving device according to claim 1, further comprising a second resistor, wherein
the second resistor is connected in series with the piezoelectric element and the first resistor,
the second resistor is connected between a positive terminal of the voltage supply unit and the first resistor, and
a resistance value of the second resistor is smaller than the insulation resistance value of the piezoelectric element and larger than the resistance value of the first resistor.

6. The driving device according to claim 1, wherein the representative value is the median of the plurality of calculated resistance values of the piezoelectric element.

7. The driving device according to claim 1, wherein the representative value is the average of the plurality of calculated resistance values of the piezoelectric element.

8. The driving device according to claim 1, wherein
the controller is configured to:
repeatedly calculate the representative value of the plurality of calculated resistance values of the piezoelectric element to generate a plurality of calculated representative values,
calculate a slope of the plurality of calculated representative values, and
determine whether or not deterioration has occurred in the piezoelectric element by comparing the slope with a predetermined threshold value.

9. A driving device comprising:
a piezoelectric element;
a first resistor connected in series with the piezoelectric element;
a voltage supply unit for supplying a DC voltage across the series connection circuit formed by the piezoelectric element and the first resistor;
a measuring unit for measuring a voltage of the first resistor, and
a control unit for controlling the voltage supply unit and the measuring unit; wherein
the resistance value of the first resistor is smaller than an insulation resistance value of the piezoelectric element,
the measuring unit measures the voltage of the first resistor, in a state where a predetermined voltage is supplied from the voltage supply unit,
the control unit calculates a resistance value of the piezoelectric element from the voltage value obtained by the measurement of the measuring unit and determines whether or not deterioration has occurred in the piezoelectric element, based on the calculated resistance value,
the measuring unit measures the voltage of the first resistor for a plurality of times, in a state where the predetermined voltage is supplied from the voltage supply unit, and
the control unit conducts repeatedly a process of calculating the resistance value of the piezoelectric element from each of a plurality of voltage values obtained by a plurality of measurements, and a process of calculating a representative value of the plurality of calculated resistance values of the piezoelectric element, calculates a slope of the plurality of calculated representative values, and determines whether or not deterioration has occurred in the piezoelectric element by comparing the slope with a predetermined threshold value.

10. A deterioration detection method of a piezoelectric element in the driving device including the piezoelectric element, a first resistor connected in series with the piezoelectric element, a voltage supply unit for supplying a DC voltage, and a measuring unit for measuring the voltage, comprising:
  a step of supplying, by the voltage supply unit, a predetermined DC voltage across the series connection circuit of the piezoelectric element and the first resistor,
  a measurement step of measuring a voltage of the first resistor by the measuring unit, in a state of supplying the predetermined DC voltage,
  a calculation step of calculating a resistance value of the piezoelectric element from the voltage value obtained by the measurement step, and
  a step of determining whether or not deterioration has occurred in the piezoelectric element, based on the resistance value calculated by the calculation step.

11. The deterioration detection method of claim 10, further comprising:
  obtaining a plurality of measurements by measuring the voltage of the first resistor a plurality of times, in the state where the predetermined voltage is supplied from the voltage supply unit,
  calculating the resistance value of the piezoelectric element from each of a plurality of voltage values obtained by the plurality of measurements,
  calculating a representative value of the plurality of calculated resistance values of the piezoelectric element, the representative value being an average or median of the plurality of calculated resistance values of the piezoelectric element, and
  determining whether or not deterioration has occurred in the piezoelectric element, based on the representative value.

12. The deterioration detection method of claim 11, wherein the representative value is the median of the plurality of calculated resistance values of the piezoelectric element.

13. The deterioration detection method of claim 11, wherein the representative value is the average of the plurality of calculated resistance values of the piezoelectric element.

14. The deterioration detection method according to claim 11, further comprising:
  repeatedly calculating the representative value of the plurality of calculated resistance values of the piezoelectric element to generate a plurality of calculated representative values,
  calculating a slope of the plurality of calculated representative values, and
  determining whether or not deterioration has occurred in the piezoelectric element by comparing the slope with a predetermined threshold value.

* * * * *